(12) United States Patent
Wang et al.

(10) Patent No.: US 10,965,636 B2
(45) Date of Patent: Mar. 30, 2021

(54) MESSAGE PROCESSING METHOD AND APPARATUS

(71) Applicant: Huawei Technologies Co., Ltd., Shenzhen (CN)

(72) Inventors: Chenglu Wang, Shenzhen (CN); Haitao Zhu, Shanghai (CN); Yan Tang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 7 days.

(21) Appl. No.: 16/463,557

(22) PCT Filed: Feb. 24, 2017

(86) PCT No.: PCT/CN2017/074770
§ 371 (c)(1),
(2) Date: May 23, 2019

(87) PCT Pub. No.: WO2018/094889
PCT Pub. Date: May 31, 2018

(65) Prior Publication Data
US 2019/0379627 A1 Dec. 12, 2019

(30) Foreign Application Priority Data
Nov. 26, 2016 (CN) .......................... 201611057261.2

(51) Int. Cl.
G06F 15/16 (2006.01)
H04L 12/58 (2006.01)

(52) U.S. Cl.
CPC ............ H04L 51/26 (2013.01); H04L 51/046 (2013.01); H04L 51/10 (2013.01); H04L 51/16 (2013.01); H04L 51/24 (2013.01)

(58) Field of Classification Search
USPC ......................................................... 709/206
See application file for complete search history.

(56) References Cited

U.S. PATENT DOCUMENTS

| 7,155,729 | B1 | | 12/2006 | Andrew et al. | |
|---|---|---|---|---|---|
| 8,924,493 | B1 | * | 12/2014 | Yeskel | H04L 12/1813 709/206 |
| 9,118,614 | B1 | * | 8/2015 | Rogers | H04L 51/36 |
| 2002/0198946 | A1 | * | 12/2002 | Wang | H04L 51/04 709/206 |

(Continued)

FOREIGN PATENT DOCUMENTS

| CN | 1956483 A | 5/2007 |
|---|---|---|
| CN | 101834949 A | 9/2010 |

(Continued)

Primary Examiner — Anthony Mejia
(74) Attorney, Agent, or Firm — Slater Matsil, LLP

(57) ABSTRACT

A message processing method and apparatus The method includes determining an importance level of each application on a terminal according to a historical use feature of the respective application, determining a notification manner of a notification message of each application according to the importance level for the respective application, and displaying, when receiving a notification message, the notification message according to the notification manner corresponding to the application to which the notification message belongs.

18 Claims, 6 Drawing Sheets

(56) References Cited

U.S. PATENT DOCUMENTS

| | | | |
|---|---|---|---|
| 2011/0060996 A1* | 3/2011 | Alberth, Jr. | H04L 51/24 715/736 |
| 2013/0282750 A1* | 10/2013 | Paul | H04W 4/18 707/767 |
| 2014/0189030 A1 | 7/2014 | Benchenaa et al. | |
| 2014/0189533 A1* | 7/2014 | Krack | G06F 3/0481 715/753 |
| 2014/0282003 A1* | 9/2014 | Gruber | G06F 3/167 715/727 |
| 2015/0188871 A1* | 7/2015 | Lewis | H04L 51/24 709/207 |
| 2016/0086241 A1* | 3/2016 | Proulx | H04L 67/26 705/26.4 |
| 2016/0203415 A1 | 7/2016 | Chaiyochlarb et al. | |
| 2016/0315902 A1* | 10/2016 | Silva | H04W 4/21 |
| 2016/0366569 A1 | 12/2016 | Wu et al. | |
| 2017/0185650 A1* | 6/2017 | Vainas | G06F 1/163 |
| 2017/0344092 A1* | 11/2017 | Bluestein | G06F 1/329 |
| 2018/0040229 A1* | 2/2018 | Munusamy | H04W 4/80 |
| 2018/0335968 A1* | 11/2018 | Pauley | G06F 11/3034 |
| 2019/0334848 A1* | 10/2019 | Chen | H04L 51/26 |
| 2020/0220969 A1* | 7/2020 | Jonsson | H04M 1/72586 |

FOREIGN PATENT DOCUMENTS

| | | |
|---|---|---|
| CN | 101895630 A | 11/2010 |
| CN | 103179264 A | 6/2013 |
| CN | 103634370 A | 3/2014 |
| CN | 103648084 A | 3/2014 |
| CN | 104009910 A | 8/2014 |
| CN | 104813255 A | 7/2015 |
| CN | 105187641 A | 12/2015 |
| CN | 105515953 A | 4/2016 |
| CN | 105630853 A | 6/2016 |
| CN | 105786469 A | 7/2016 |
| EP | 3151479 A1 | 4/2017 |
| JP | 2006172464 A | 6/2006 |
| JP | 2015069230 A | 4/2015 |

* cited by examiner

US 10,965,636 B2

MESSAGE PROCESSING METHOD AND APPARATUS

CROSS REFERENCE TO RELATED APPLICATIONS

This application is a National Stage of International Application No. PCT/CN2017/074770, filed on Feb. 24, 2017, and which claims the benefit of Chinese Patent Application No. 201611057261.2, filed with the Chinese Patent Office on Nov. 26, 2016 and entitled "MOBILE PHONE INTELLIGENT NOTIFICATION METHOD AND DEVICE", each which are incorporated herein by reference in their entirety.

TECHNICAL FIELD

The present invention relates to the field of communications technologies, and in particular, to a message processing method and apparatus

BACKGROUND

With development and popularization of smartphones, various applications on smartphones provide much convenience to people's lives. Because there are more applications installed on the smartphone, there are a growing number of various notification messages such as short message service (SMS) message notifications and push messages of various applications on the smartphone. These notification messages include messages that a user really needs, and also include some spam messages such as advertisement emails and spam SMS messages. It is very inconvenient for the user to read required messages when useful messages and the spam messages are mixed together.

Currently, to manage the notification messages in the smartphone, the user may select to suppress notification messages of some applications, so that the messages of these applications are not displayed in a notification bar. Although a quantity of notification messages can be reduced by using the method, the user easily cannot see important messages in time, and useful messages and spam messages may still exist in applications that are not suppressed. Therefore, the notification message processing method in the prior art is insufficiently intelligent.

SUMMARY OF THE INVENTION

Embodiments of the present invention provide a message processing method and apparatus, to resolve a prior-art problem that intelligence of a notification message processing method is relatively low.

To achieve the foregoing objective, the following technical solutions are used in the embodiments of the present invention.

According to a first aspect, an embodiment of the present invention provides a message processing method, including determining an importance level of each application based on a historical use feature of each application on a terminal, and then determining a notification manner of a notification message of each application based on the importance level of each application, so that when receiving a notification message, the terminal displays the notification message in the notification manner corresponding to the application to which the notification message belongs. It can be learned that in this embodiment of the present invention, not all the notification manners are displayed in a same manner, the importance level of each application may be determined based on a use habit of a user for each application, and the notification message of the application of each importance level corresponds to one notification manner, so that notification messages of applications with different importance levels are displayed in different notification manners. Therefore, a requirement and a habit of the user for viewing the message can be satisfied, thereby improving intelligence for processing the notification message.

In a possible design, before displaying the notification message, the terminal further needs to determine a notification time period of each application based on an online time and/or an application type of each application. The online time of the application may reflect a time spent by the user in using the application, and the notification time period of each application is determined with reference to the online time and the application type, so that the notification time period of the application satisfies the use habit of the user. In addition, the application type is considered when the notification time period is determined. For example, a notification time period of a work-type application is a working time, and a notification time period of an entertainment application is a non-working time. Therefore, processing on the notification message is more intelligent.

In a possible design, a specific method for notifying the notification message in the terminal is when receiving a notification message, determining whether a current moment is in the notification time period of the application to which the notification message belongs, and if current moment is in the notification time period of the application to which the notification message belongs, displaying the notification message in the notification manner corresponding to the application to which the notification message belongs, or if current moment is not in the notification time period of the application to which the notification message belongs, temporarily storing the notification message, and displaying, when the current moment reaches the notification time period of the application to which the notification message belongs, the notification message in the notification manner corresponding to the application to which the notification message belongs. The notification message is processed in an appropriate time segment, so that the user is prevented from being interfered by some inopportune notification messages, thereby improving the intelligence for processing the notification message.

In a possible design, the historical use feature includes at least one of use duration, a quantity of times of starting, and a quantity of application download times, and a method for determining the importance level of each application by the terminal is sorting use duration of the applications, and dividing the applications into N first type sets in descending order of the use duration, where N is a positive integer greater than 1, and serial numbers of the N first type sets are 1 to N, sorting quantities of times of starting the applications, and dividing the applications into N second type sets in descending order of the quantities of times of starting, where serial numbers of the N second type sets are 1 to N, sorting quantities of application download times of the applications, and dividing the applications into N third type sets in descending order of the quantities of application download times, where serial numbers of the N third type sets are 1 to N, and then sequentially sifting out an identical application from the first type set, the second type set, and the third type set that correspond to each serial number, to form an importance level set corresponding to each serial number, where a smaller serial number of the importance level set indicates a higher importance level of the application in the importance level set. It can be learned that the importance level of the application is determined based on the use duration of the application, so that it can be ensured that the notification message of the application frequently used by the user is notified in time. Therefore, a notification occasion of the notification message more satisfies the use habit of the user.

In a possible design, in a process in which the terminal sequentially sifts out the identical application from the first type set, the second type set, and the third type set that correspond to each serial number, to form the importance level set corresponding to each serial number, each time an identical application is sifted out from the first type set, the second type set, and the third type set that correspond to one serial number, the identical application in the first type set, the second type set, and the third type set that correspond to the current serial number needs to be used as the importance level set corresponding to the current serial number, and then applications that are not sifted out from the first type set, the second type set, and the third type set that correspond to the current serial number are respectively added to the first type set, the second type set, and the third type set that correspond to a next serial number.

In a possible design, after the terminal determines the importance level of each application based on the use duration, the quantity of times of starting, and the quantity of download times of each application on the terminal, the terminal may further receive a change instruction entered by the user, where the change instruction carries an importance level of the application, and changes, based on the change instruction, the importance level of the application that corresponds to the change instruction to the importance level carried in the change instruction. It can be learned that the terminal may automatically determine the importance level of the application based on historical data, and the user may also change the importance level of the application based on a real-time requirement of the user, so that the notification occasion of the notification message more satisfies the requirement of the user, thereby further improving the intelligence for processing the notification message.

According to another aspect, an embodiment of the present invention provides a message processing apparatus. The apparatus may implement a function performed by the terminal in the foregoing example of the method, and the function may be implemented by using hardware or may be implemented by hardware executing corresponding software. The hardware or software includes one or more modules corresponding to the foregoing function.

In a possible design, a structure of the apparatus includes a processor and a display unit. The processor is configured to enable the apparatus to perform a corresponding function in the foregoing method. The display is configured to enable the apparatus to display the notification message. The apparatus may further include a memory. The memory is configured to couple to the processor and store a necessary program instruction and necessary data of the apparatus.

According to still another aspect, an embodiment of the present invention provides a communications system. The system includes the terminal according to the foregoing aspects and a cloud server.

According to yet another aspect, an embodiment of the present invention provides a computer storage medium, configured to store a computer software instruction used by the foregoing terminal. The computer software instruction includes a program designed for performing the foregoing aspects.

Compared with the prior art, in the embodiments of the present invention, not all the notification manners are displayed in a same manner, the importance level of each application may be determined based on a use habit of a user for each application, and the notification message of the application of each importance level corresponds to one notification manner, so that notification messages of applications with different importance levels are displayed in different notification manners. Therefore, a requirement and a habit of the user for viewing the message can be satisfied, thereby improving intelligence for processing the notification message.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

DETAILED DESCRIPTION OF ILLUSTRATIVE EMBODIMENTS

Network architectures and service scenarios described in the embodiments of the present invention aim to more clearly describe the technical solutions in the embodiments of the present invention, but are not intended to limit the technical solutions provided in the embodiments of the present invention. A person of ordinary skill in the art may know that as the network architectures evolve and a new service scenario emerges, the technical solutions provided in the embodiments of the present invention are further applicable to a similar technical problem.

It should be noted that in the embodiments of the present invention, the word "example" or "for example" is used to represent giving an example, an illustration, or a description. Any embodiment or design scheme described as an "example" or "for example" in the embodiments of the present invention should not be explained as being more preferred or having more advantages than another embodiment or design scheme. Exactly, use of the word "example" or "for example" or the like is intended to present a related concept in a specific manner.

It should be noted that in the embodiments of the present invention, "of", "relevant" and "corresponding" may be mixed during use sometimes. It should be noted that when a difference thereof is de-emphasized, meanings expressed by them are the same.

A terminal, also referred to as user equipment (UE), is a device providing voice and/or data connectivity to a user, for example, a handheld device or an in-vehicle device having a wireless connection function. A common terminal may, for example, include a mobile phone, a tablet computer, a notebook computer, a palmtop computer, a mobile Internet device (MID), a wearable device such as a smartwatch, a smart helmet, a smart band, or a pedometer.

Figure 1:
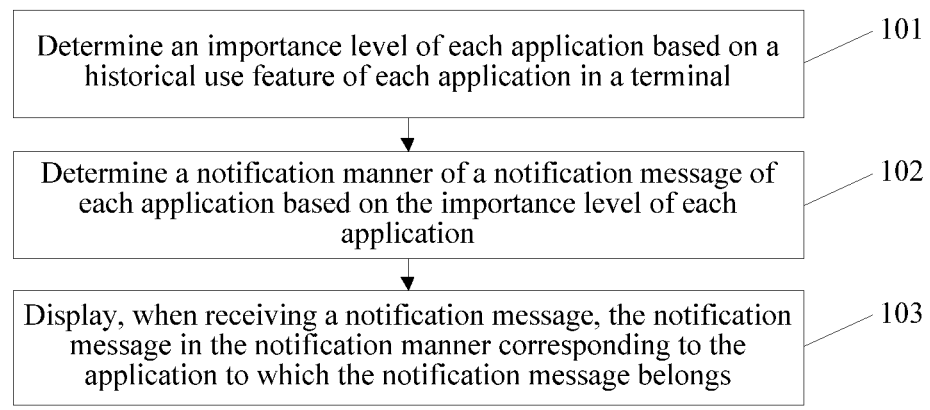
FIG. 1 is a flowchart of a message processing method according to an embodiment of the present invention.

To improve intelligence for processing a notification message, an embodiment of the present invention provides a message processing method. The method is performed by a terminal. As shown in FIG. 1, the method includes the following steps.

101. Determine an importance level of each application based on a historical use feature of each application on a terminal.

The historical use feature includes at least one of use duration, a quantity of times of starting, and a quantity of application download times of the application. The use duration of the application is accumulated use duration of the application on a foreground excluding a running time of the application on a background. The quantity of application download times is obtained by the terminal from a cloud server. The cloud server may collect statistics on a total quantity of download times of each application, to determine the quantity of application download times.

It should be noted that the use duration of each application and the quantity of times of starting may reflect a use habit of a user for the application. For example, if the user frequently starts an application, it indicates that the user often needs to use the application, so that the importance level of the application is relatively high. When a notification message of the application is received, the notification message needs to be notified in time, so that the user may see the notification message of the application in time. That is, a longer use duration, a larger quantity of times of starting, and a larger quantity of application download times of an application indicate a higher importance level of the application.

It should be further noted that the terminal periodically collects statistics on the use duration, the quantity of times of starting, and the quantity of application download times of each application, and updates the importance level of the application.

102. Determine a notification manner of a notification message of each application based on the importance level of each application.

For example, there may be three importance levels, and the three importance levels are respectively important, unimportant, and very unimportant.

The notification message of the application whose importance level is important may be prompted by using a pop-up window, and a display location of the notification message of the application whose importance level is important is before that of the notification message of the application whose importance level is unimportant.

If the terminal is in a screen-locked state, the notification message of the application whose importance level is important may be displayed on a lock screen interface by using a pop-up window.

In addition, the notification message of the application whose importance level is important may be set to be prompted at an interval before the user processes the message.

The notification message of the application whose importance level is unimportant may be displayed in a notification bar instead of being prompted by using a pop-up window.

The notification message of the application whose importance level is very unimportant may be a spam SMS message or a spam advertisement, so that the notification message may not be notified.

103. Display, when receiving a notification message, the notification message in the notification manner corresponding to the application to which the notification message belongs.

In an example, it is determined by using step 101 that for a terminal A, an importance level of WeChat is important, an importance level of a microblog is unimportant, and an importance level of QQ is very unimportant.

Figure 1A:
FIG. 1a is an example of a schematic diagram of a message processing method according to an embodiment of the present invention.

In this case, when a notification message of WeChat is received, the notification message is displayed by using a pop-up window, as shown in FIG. 1*a*.

Figure 1B:
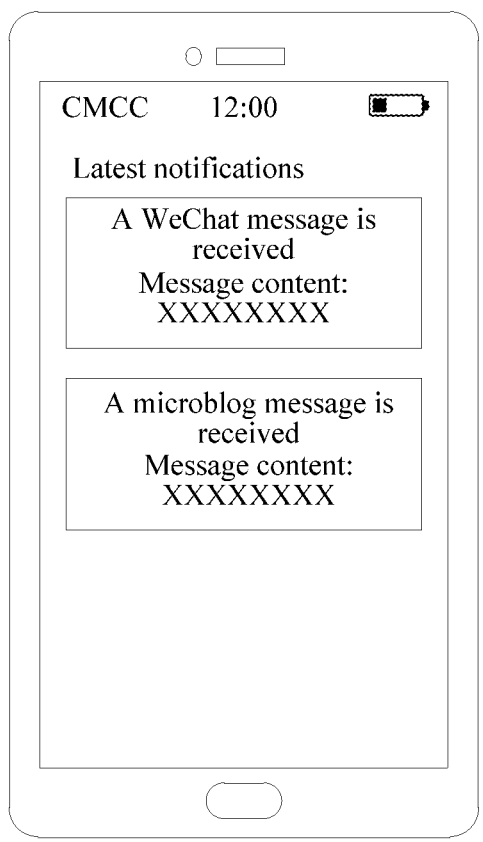
FIG. 1b is an example of a schematic diagram of another message processing method according to an embodiment of the present invention.

When a notification message of the microblog is received, the notification message is displayed in a notification bar, and if the notification message of WeChat is not processed at this time, the notification message of the microblog is located below the notification message of WeChat in the notification bar, as shown in FIG. 1*b*.

When a notification message of QQ is received, the terminal does not prompt a terminal message of QQ. A user may see the notification message of QQ only when opening the QQ user interface.

It should be noted that if an application has various types of notification messages, a notification policy of each type of the notification message may be preset. For example, an update message of the application may be set to be prompted when the application is started, and a social message of the application is prompted in the notification manner determined in step 102.

Figure 1C:
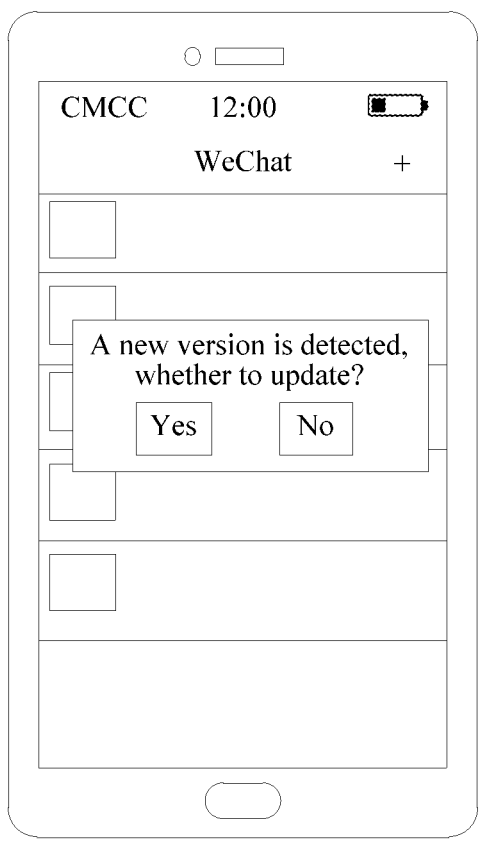
FIG. 1c is an example of a schematic diagram of another message processing method according to an embodiment of the present invention.

Specifically, using WeChat as an example, an update message of WeChat may be set to be prompted by using a pop-up window when WeChat is started, as shown in FIG. 1*c*. A chat message of WeChat is prompted in the notification manner determined in step 102. If the notification manner of WeChat is important, the chat message of WeChat is prompted by using a pop-up window and is displayed at the top of the notification bar. If the notification manner of WeChat is unimportant, the chat message of WeChat is displayed in the notification bar instead of being prompted by using a pop-up window. When a message of an official account of WeChat is received, the message of the official account is not prompted by using a pop-up window and is not displayed in the notification bar of the terminal. When the user starts WeChat, the unread message of the official account is identified by using a symbol. For example, if a little red point is displayed at the upper right corner of a profile image of the official account, it indicates that there is an unread message in the official account.

In the message notification method provided in this embodiment of the present invention, the terminal may determine the importance level of each application based on the historical use feature of each application, and then determine the notification manner of the notification message of each application based on the importance level of each application, so that when a notification message is received, the notification message is displayed in the notification manner corresponding to the application to which the notification message belongs. Compared with the prior art, not all the notification manners are displayed in a same manner, the importance level of each application may be determined based on the use habit of the user for each application, and the notification message of the application of each importance level corresponds to one notification manner, so that notification messages of applications with different importance levels are displayed in different notification manners. Therefore, a requirement and a habit of the user for viewing the message can be satisfied, thereby improving intelligence for processing the notification message.

A method for determining the importance level of each application based on the use duration, the quantity of times of starting, and the quantity of application download times of each application on the terminal in step 101 is described below.

Use duration of the applications are sorted, the applications are divided into N first type sets in descending order of the use duration, N is a positive integer greater than 1, and serial numbers of the N first type sets are 1 to N. For example, it is assumed that there are nine applications, and the nine applications are an application 1 to an application 9, a first type set 1 is {the application 1, the application 2, and the application 3}, a first type set 2 is {the application 4, the application 5, and the application 6}, and a first type set 3 is {the application 7, the application 8, and the application 9}.

Quantities of times of starting the applications are sorted, the applications are divided into N second type sets in descending order of the quantities of times of starting, and serial numbers of the N second type sets are 1 to N. For example, a second type set 1 is {the application 1, the application 2, and the application 4}, a second type set 2 is {the application 3, the application 5, and the application 6}, and a second type set 3 is {the application 7, the application 8, and the application 9}.

Quantities of application download times of the applications are sorted, the applications are divided into N third type sets in descending order of the quantities of application download times, and serial numbers of the N third type sets are 1 to N. For example, a third type set 1 is {the application 1, the application 3, and the application 5}, a third type set 2 is {the application 2, the application 4, and the application 6}, and a third type set 3 is {the application 7, the application 8, and the application 9}.

In the foregoing processing process, the applications are respectively added into the N first type sets, the N second type sets, and the N third type sets in different manners, and then an identical application is sequentially sifted out from the first type set, the second type set, and the third type set that correspond to each serial number, to form an importance level set corresponding to each serial number. A smaller serial number of the importance level set indicates a higher importance level of the application in the importance level set.

Each time an identical application is sifted out from the first type set, the second type set, and the third type set that correspond to one serial number, the identical application in the first type set, the second type set, and the third type set that correspond to the current serial number is used as the importance level set corresponding to the current serial number, and applications that are not sifted out from the first type set, the second type set, and the third type set that correspond to the current serial number are respectively added to the first type set, the second type set, and the third type set that correspond to a next serial number.

With reference to the foregoing example, an identical application in the first type set {the application 1, the application 2, and the application 3}, the second type set {the application 1, the application 2, and the application 4}, and the third type set {the application 1, the application 3, and the application 5} that correspond to the serial number 1 is the application 1. Therefore, a first importance level set is {the application 1}.

After the first level set is determined, the first type set with the serial number 2 is updated to {the application 2, the application 3, the application 4, the application 5, and the application 6}, the second type set with the serial number 2 is updated to {the application 2, the application 3, the application 4, the application 5, and the application 6}, and the third type set with the serial number 2 is updated to {the application 2, the application 3, the application 4, the application 5, and the application 6}, so that a second importance level set formed by identical applications sifted out from the first type set, the second type set, and the third type set is {the application 2, the application 3, the application 4, the application 5, and the application 6}.

Then, identical applications in the first type set {the application 7, the application 8, and the application 9}, the second type set {the application 7, the application 8, and the application 9}, and the third type set {the application 7, the application 8, and the application 9} that are with the serial number 3 are the application 7, the application 8, and the application 9. Therefore, a third importance level set is {the application 7, the application 8, and the application 9}.

In another example, the applications are sorted based on use duration of the applications, to obtain four first type sets. The four first type sets are respectively a time 1, a time 2, a time 3, and a time 4. The top 20% of the applications whose use duration ranked top form the time 1, the following 30% of the applications form the time 2, the following 30% of the applications form the time 3, and the bottom 20% of the applications form the time 4. The applications are sorted based on the quantities of times of starting, and still based on intervals of 20%, 30%, 30%, and 20% ranked from top to bottom, four second type sets, namely, a count 1, a count 2, a count 3, and a count 4, are sequentially obtained. The applications are sorted based on the quantities of application download times, and still based on the intervals of 20%, 30%, 30%, and 20% ranked from top to bottom, four third type sets, namely, a number 1, a number 2, a number 3, and a number 4, are sequentially obtained. First, an identical application is sifted out from the time 1, the count 1, and the number 1, to form a first importance level set, and then the unselected application in the time 1 is added to the time 2, the unselected application in the count 1 is added to the count 2, and the unselected application in the number 1 is added to the number 2. A second importance level set, a third importance level set, and a fourth importance level set may be sequentially determined based on the method. Importance levels of the applications in the first importance level set, the second importance level set, the third importance level set, and the fourth importance level set decrease sequentially.

Alternatively, identical applications may be sequentially sifted out first from the time 1, the time 2, the time 3, and the time 4 and the count 1, the count 2, the count 3, and the count 4 based on the foregoing method, to obtain four sets, and then the four obtained sets are respectively compared with the number 1, the number 2, the number 3, and the number 4. Finally, the first importance level set, the second importance level set, the third importance level set, and the fourth importance level set are obtained.

Further, after the importance level set is determined, the importance level set is further stored corresponding to the notification manner of the notification message. In this way, after a notification message of the application is received, the notification manner of the notification message may be determined based on the importance level of the application.

For example, a correspondence between the importance level set and the notification manner of the notification message is shown in Table 1:

TABLE 1

| | |
|---|---|
| First importance level set (for example, WeChat is included) | The notification message is displayed by using a pop-up window and is prompted through vibration |
| Second importance level set (for example, the microblog is included) | The notification message is displayed in the notification bar and is prompted through vibration |
| Third importance level set (for example, QQ is included) | The notification message is displayed in the notification bar without being prompted through vibration |
| Fourth importance level set | The notification message is not prompted |

It should be noted that the correspondence between the importance level set and the notification manner of the notification message in the foregoing table is merely an example, and a quantity of importance levels and the notification manner corresponding to the application in each importance level may be set based on an actual requirement.

Still with reference to the foregoing table, when receiving a message of WeChat, the terminal may determine that WeChat belongs to the first importance level set, and further determine that the notification manner corresponding to the first importance level set is displaying the notification message by using a pop-up window and prompting the notification message through vibration. Therefore, the terminal displays the message of WeChat in a pop-up window and prompts the message through vibration.

When receiving a message of the microblog, the terminal may determine that the microblog belongs to the second importance level set, and further determine that the notification manner corresponding to the second importance level set is displaying the notification message in the notification bar and prompts the notification message through vibration. Therefore, the terminal displays the message of the microblog in the notification bar and prompts the message through vibration.

Figure 2:
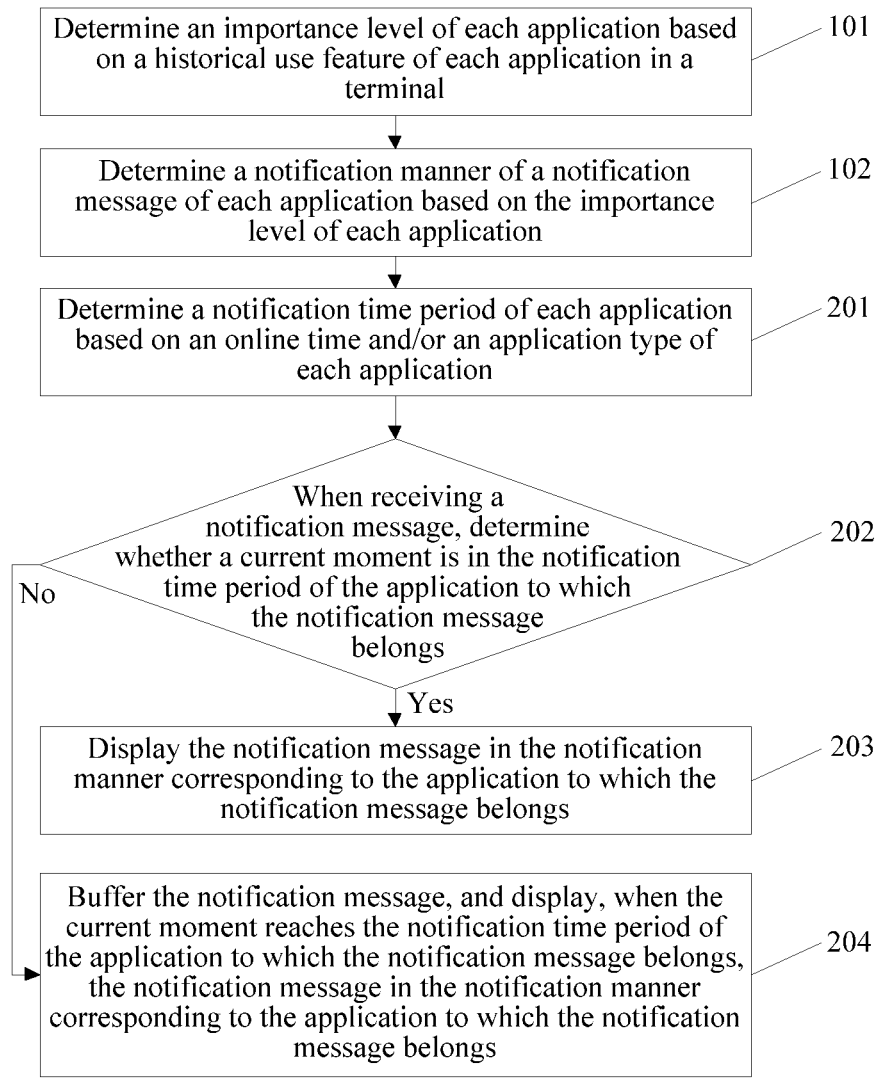
FIG. 2 is a flowchart of another message processing method according to an embodiment of the present invention.

With reference to the method procedure shown in FIG. 1, to more intelligently process the notification message, not only the notification manner of the notification message of each application needs to be determined, but also a notification time period needs to be determined. Based on this, in another implementation according to an embodiment of the present invention, as shown in FIG. 2, the method further includes the following steps.

201. Determine a notification time period of each application based on an online time and/or an application type of each application.

The terminal may determine the notification time period of each application based on the online time of each application, or determine the notification time period of each application based on the application type of each application, or determine the notification time period of each application based on the online time and the application type of each application.

The terminal may determine the application type of each application by itself, or may obtain the application type of each application from the cloud server.

Specifically, one day 24 hours may be divided into a plurality of time segments. For example, one day is divided into a sleep time segment, a dining time segment, a working time segment, a leisure time segment, and the like. Each application type corresponds to a use time segment. For example, a work-type application is usually used in a working time, and an entertainment type application is usually used in a non-working time.

It is determined based on the online time of each application that the user usually uses each application in which time segment, and it is determined with reference to the application type that the notification time period of each application is the sleep time segment, the dining time segment, or the working time segment. If the online time of the application belongs to two time segments, it is determined that the online time of the application in which time segment is longer, and the time segment in which the online time is longer is determined as the notification time period.

For example, if the online time of the application is from 9:30 to 10:30, it may be determined that the online time of the application is in the working time segment, and the application type of the application is the work-type application, so that it may be finally determined that the notification time period of the application is the working time segment.

It may be understood that based on that the notification time period of each application is determined, when the notification message is received, a moment for displaying the notification message further needs to be determined. Therefore, the displaying, when receiving a notification message, the notification message in the notification manner corresponding to the application to which the notification message belongs in step 103 may be specifically implemented as step 202 to step 204.

202. When receiving a notification message, determine whether a current moment is in the notification time period of the application to which the notification message belongs. If current moment is in the notification time period of the application to which the notification message belongs, perform step 204, or if current moment is not in the notification time period of the application to which the notification message belongs, perform step 205.

For example, if the current moment is the working time segment and the notification time period of the application to which the received notification message belongs is also the working time segment, step 203 may be performed, and the notification is immediately displayed in the notification manner of the application to which the notification message belongs.

If the current moment is the working time segment and the notification time period of the application to which the received notification message belongs is the leisure time segment, step 204 is performed, and the notification is displayed in the notification manner of the application to which the notification message belongs in the leisure time segment.

203. Display the notification message in the notification manner corresponding to the application to which the notification message belongs.

204. Buffer the notification message, and display, when the current moment reaches the notification time period of the application to which the notification message belongs, the notification message in the notification manner corresponding to the application to which the notification message belongs.

In the embodiments of the present invention, not only the notification manner corresponding to the notification message of each application needs to be determined, but also the notification time period of each application needs to be determined, so that the notification message may be notified at an appropriate time. Therefore, the user may see an important notification message in time, and do not miss any common notification message, in addition, a useless notification message is prevented from affecting rest or working of the user, thereby further improving the intelligence for processing the notification message.

Figure 3:
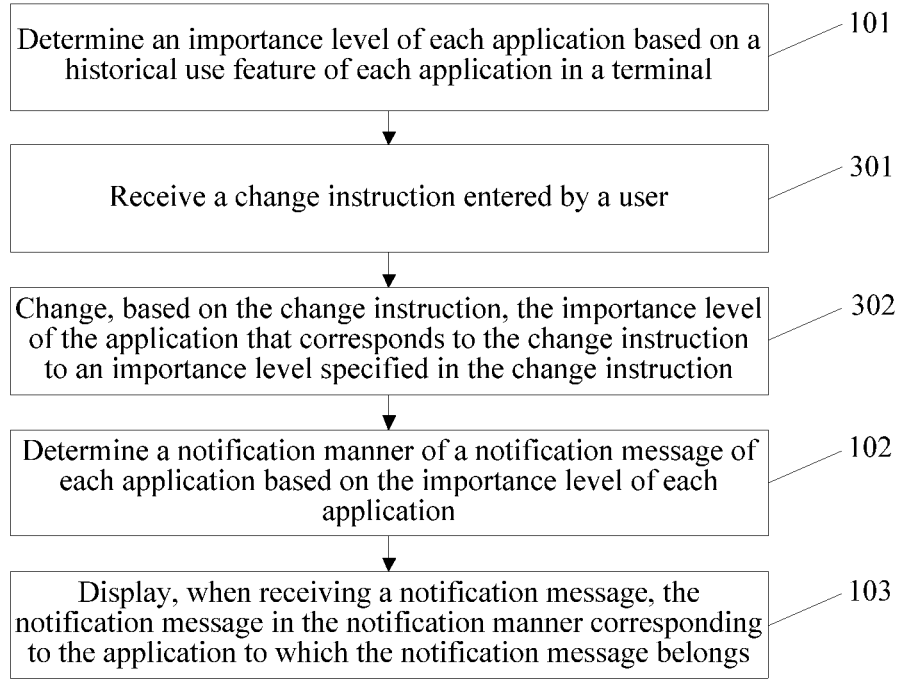
FIG. 3 is a flowchart of another message processing method according to an embodiment of the present invention.

It should be noted that the importance level determined by the terminal based on the use duration and the quantity of download times of the application may not always satisfy a subsequent requirement of the user. For example, the user may use an application that is seldom used because of an important working requirement. To make the notification manner of the notification message and the notification time more satisfy the requirement of the user, the user may also manually adjust the importance level of the application. Based on this, in another implementation according to an embodiment of the present invention, as shown in FIG. 3, after the determining an importance level of each application based on a historical use feature of each application on a terminal in step 101, the method further includes the following steps.

301. Receive a change instruction entered by a user.

The change instruction of the user may carry an importance level of the application, that is, the user may enter the level of the application in an input box. Alternatively, a setting screen of the terminal may display an importance level option of each application, and the change instruction entered by the user is a click operation on the importance level option of the application.

302. Change, based on the change instruction, the importance level of the application that corresponds to the change instruction to an importance level specified in the change instruction.

It may be understood that the importance level specified in the change instruction is the importance level entered by the user or the importance level selected by the user in step 301.

It should be noted that after changing the importance level of the application based on the change instruction entered by the user, the terminal further needs to perform step 102 again, to determine a notification manner of the notification message of each application again.

In addition, the terminal may further receive a notification time period change instruction entered by the user, and change the notification time period of the application based on the notification time period change instruction, so that the user may set the notification time of the application based on a living habit of the user.

In the message processing method provided in the embodiments of the present invention, the terminal may determine the importance level of each application based on the use duration, the quantity of times of starting, and the quantity of application download times of each application, to determine the notification manner of each application, and determine the notification time period of the notification message of each application based on the online time and the application type of each application. Alternatively, the user may set the importance level of the application and the notification time period. Therefore, the notification manner and the notification time of the notification message more satisfy the requirement of the user, thereby improving the intelligence for processing the message.

In the foregoing descriptions, the solutions provided in the embodiments of the present invention are described mainly from a perspective of the terminal. It may be understood that the terminal includes corresponding hardware structures and/or software modules for performing the functions. A person skilled in the art should easily be aware that, in combination with examples of units and algorithm steps described in the embodiments disclosed in this specification, the present invention may be implemented in a hardware form or a form of a combination of hardware and computer software. Whether a function is performed by using hardware or by driving the hardware by the computer software depends on particular applications and design constraints of the technical solutions. A person skilled in the art may use different methods to implement the described functions for each particular application, but it should not be considered that the implementation goes beyond the scope of the present invention.

In the embodiments of the present invention, functional modules of the terminal may be divided based on the foregoing method examples. For example, functional modules may be divided corresponding to the functions, or two or more functions may be integrated into one processing module. The integrated module may be implemented in a form of hardware, or may be implemented in a form of a software functional module. It should be noted that the module division in the embodiments of the present invention is an example, and is merely logical function division. There may be another division manner in an actual implementation.

Figure 4:
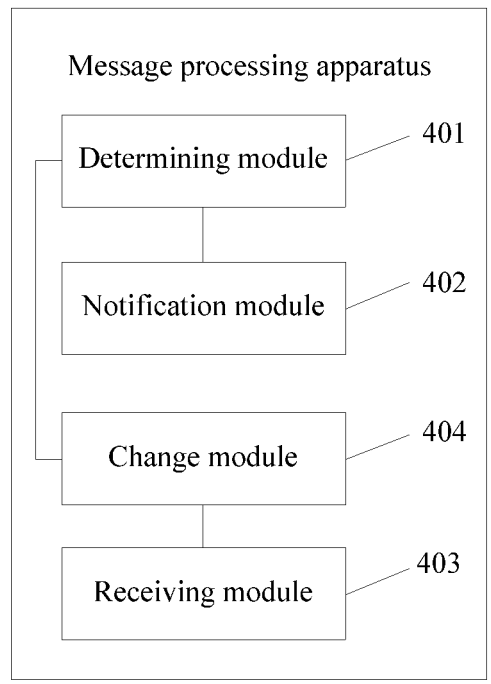
FIG. 4 is a schematic structural diagram of a message processing apparatus according to an embodiment of the present invention.

When the functional modules are divided corresponding to the functions again, an embodiment of the present invention further provides a message processing apparatus. The apparatus may be the terminal in the foregoing embodiments. As shown in FIG. 4, FIG. 4 shows the apparatus in the foregoing embodiments. For example, FIG. 4 is a possible schematic structural diagram of the terminal. The apparatus includes a determining module 401, a notification module 402, a receiving module 403, and a change module 404. The determining module 401 is configured to enable the terminal to perform step 101 and step 102 in FIG. 1 and step 201 and step 202 in FIG. 2. The notification module 402 is configured to enable the terminal to perform step 103 in FIG. 1 and step 203 and step 204 in FIG. 2. The receiving module 403 is configured to enable the terminal to perform step 301 in FIG. 3. The change module 404 is configured to enable the terminal to perform step 302 in FIG. 3. For the functional descriptions of the corresponding functional modules, refer to all related content of the steps in the foregoing method embodiments, and details are not described herein again.

Figure 5:
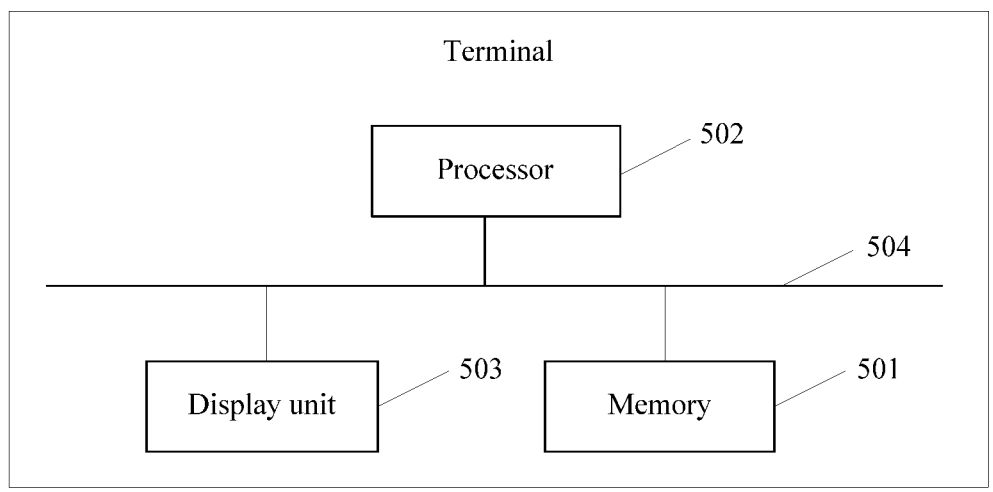
FIG. 5 is a schematic structural diagram of a terminal according to an embodiment of the present invention.

When an integrated unit is used, FIG. 5 is another possible schematic structural diagram of the terminal in the foregoing embodiments of the present invention. As shown in FIG. 5, the terminal includes a processor 502, a display unit 503, a memory 501, and a bus 504. The display unit 503, the processor 502, and the memory 501 are connected to each other by using the bus 504. The bus 504 may be a peripheral component interconnect (Peripheral Component Interconnect, PCI) bus, an extended industry standard architecture (Extended Industry Standard Architecture, EISA) bus, or the like. The bus may be classified into an address bus, a data bus, a control bus, or the like. For ease of representation, the bus in FIG. 5 is represented by using only one bold line, but this does not indicate that there is only one bus or only one type of bus.

The memory 501 is configured to store program code and data of the terminal. The display unit 503 is configured to display the notification message under control of the processor 502. The processor 502 is configured to control and manage an operation of the terminal. For example, the processor 502 is configured to enable the terminal to perform step 101 to step 103 in FIG. 1, step 101 and step 202 in FIG. 2, and step 302 in FIG. 3, and/or another process of the technology described in this specification.

Method or algorithm steps described in combination with the content disclosed in the present invention may be implemented by using hardware, or may be implemented by a processor by executing a software instruction. The software instruction may include a corresponding software module. The software module may be stored in a random access memory (RAM), a flash memory, a read-only memory (ROM), an erasable programmable read only memory (EPROM), an electrically erasable programmable read only memory (EEPROM), a register, a hard disk, a mobile hard disk, a compact disc read-only memory (CD-ROM), or a storage medium of any other form well-known in the art. For example, a storage medium is coupled to a processor, so that the processor can read information from the storage medium or write information into the storage medium. Certainly, the storage medium may alternatively be a component of the processor. The processor and the storage medium may be located in an application specific integrated circuit (ASIC). In addition, the ASIC may be located in a core network interface device. Certainly, the processor and the storage medium may exist in the core network interface device as discrete components.

Based on the foregoing descriptions of the implementations, a person skilled in the art may clearly understand that the present invention may be implemented by using software in addition to necessary universal hardware or by using hardware only. In most circumstances, the former is a preferred implementation. Based on such an understanding, the technical solutions of the present invention essentially or the part contributing to the prior art may be implemented in a form of a software product. The software product is stored in a readable storage medium, such as a floppy disk, a hard disk, or an optical disc of a computer, and includes several instructions for instructing a computer device (which may be a personal computer, a server, or a network device) to perform the methods described in the embodiments of the present invention.

The foregoing descriptions are merely specific implementations of the present invention, but are not intended to limit the protection scope of the present invention. Any variation or replacement within the technical scope disclosed in the present invention shall fall within the protection scope of the present invention. Therefore, the protection scope of the present invention shall be subject to the protection scope of the claims.

What is claimed is:

1. A method, comprising:
   determining, by a terminal for each application on the terminal, an importance level of the respective application according to a historical use feature of the respective application, wherein the historical use feature of the respective application comprises a respective use duration, and determining an importance level of the respective application comprises;

sorting applications on the terminal according to the respective use duration of each application on the terminal;

dividing the applications into N first type sets in descending order of the respective use duration of each application on the terminal, wherein N is a positive integer greater than 1, and wherein serial numbers of the N first type sets are 1 to N;| sequentially sifting out, from the first type set, identical applications that correspond to each serial number, and, for each serial number, forming an importance level set corresponding to the respective serial number, wherein a smaller serial number of a corresponding importance level set indicates a higher importance level of any applications in the corresponding importance level set;

determining, by the terminal for each application on the terminal, a notification manner of a notification message of the respective application according to the importance level of the respective application; and in response to receiving a first notification message, displaying the first notification message according to the notification manner corresponding to the application to which the first notification message belongs.

2. The method according to claim 1, further comprising:
   determining, by the terminal for each application on the terminal, a notification time period of the respective application according to an online time or an application type of the respective application.

3. The method according to claim 2, wherein displaying the first notification message according to the notification manner corresponding to the application to which the first notification message belongs comprises:
   determining, in response to receiving the first notification message, whether a current moment is in the notification time period of the application to which the notification message belongs;
   in response to determining that the current moment is in the notification time period of the application to which the notification message belongs, displaying the first notification message according to the notification manner corresponding to the application to which the notification message belongs; and
   in response to determining that the current moment is not in the notification time period of the application to which the first notification message belongs, temporarily storing the first notification message, and displaying, when the current moment reaches the notification time period of the application to which the first notification message belongs, the first notification message according to the notification manner corresponding to the application to which the first notification message belongs.

4. The method according to claim 2, wherein the respective historical use feature of each application on the terminal further comprises a respective quantity of times the corresponding application has been started or a quantity of application download times of the corresponding application; and
   wherein determining, by the terminal for each application on the terminal, the importance level of the respective application according to the historical use feature of the respective application further comprises:
   sorting the applications on the terminal according to the respective quantity of times the corresponding application has been started of each application of the terminal, and dividing the applications into N second type sets in descending order of the respective quantity of times the corresponding application has been started of each application of the terminal, wherein serial numbers of the N second type sets are 1 to N; and sorting the applications according to the respective quantity of application download times of the corresponding application of each application of the terminal, and dividing the applications into N third type sets in descending order of the respective quantity of application download times of the corresponding application of each application of the terminal, wherein serial numbers of the N third type sets are 1 to N;

wherein sequentially shift out identical applications that correspond to each serial number further comprises sequentially sifting out, from the first type set, the second type set, and the third type set, identical applications that correspond to each serial number, and, for each serial number, forming an importance level set corresponding to the respective serial number, wherein a smaller serial number of a corresponding importance level set indicates a higher importance level of any applications in the corresponding importance level set.

5. The method according to claim 4, wherein sequentially sifting out the identical applications from the first type set, the second type set, and the third type set that correspond to each serial number, and, for each serial number, forming the respective importance level set corresponding to the respective serial number comprises:

using, each time an identical application is sifted out from the first type set, the second type set, and the third type set that corresponds to one serial number, the identical application in the first type set, the second type set, and the third type set that correspond to a current serial number as an importance level set corresponding to the current serial number; and respectively adding applications that are not sifted out from the first type set, the second type set, and the third type set that correspond to the current serial number to the first type set, the second type set, and the third type set that correspond to a next serial number.

6. The method according to claim 1, further comprising:

after, by a terminal for each application on the terminal, the respective importance level of the respective application, receiving a change instruction entered by a user; and changing, based on the change instruction, an importance level of a first application on the terminal that corresponds to the change instruction to a first importance level, wherein the first importance level is specified in the change instruction.

7. An apparatus, comprising a computer including a non-transitory computer-readable medium storing a program to be executed by the computer, the program including instructions for:

determining, for each application on the apparatus, an importance level the respective application according to a historical use feature of the respective application, wherein the historical use feature of the respective application comprises a respective use duration, and the instructions for determining an importance level of the respective application comprises instructions for;

sorting applications on the apparatus according to the respective use duration of each application on the apparatus;

dividing the applications into N first type sets in descending order of the respective use duration of each application on the apparatus, wherein N is a positive integer greater than 1, and wherein serial numbers of the N first type sets are 1 to N;| sequentially sifting out, from the first type set, identical applications that correspond to each serial number, and, for each serial number, forming an importance level set corresponding to the respective serial number, wherein a smaller serial number of a corresponding importance level set indicates a higher importance level of any applications in the corresponding importance level set;

determining, for each application on the apparatus, a notification manner of a notification message of the respective application according to the importance level of the respective application; and in response to receiving a first notification message, displaying the first notification message according to the notification manner corresponding to the application to which the first notification message belongs.

8. The apparatus according to claim 7, wherein the program further includes instructions for:

determining, for each application on the apparatus a notification time period of the respective application according to an online time or an application type of the respective application.

9. The apparatus according to claim 8, wherein the instructions for displaying the first notification message according to the notification manner corresponding to the application to which the first notification message belongs comprise instructions for:

determining, in response to receiving the first notification message, whether a current moment is in the notification time period of the application to which the first notification message belongs;

in response to determining that the current moment is in the notification time period of the application to which the first notification message belongs, displaying the first notification message according to the notification manner corresponding to the application to which the first notification message belongs; and in response to determining that the current moment is not in the notification time period of the application to which the first notification message belongs, temporarily storing the first notification message, and displaying, when the current moment reaches the notification time period of the application to which the first notification message belongs, the notification message according to the notification manner corresponding to the application to which the first notification message belongs.

10. The apparatus according to claim 8, wherein the respective historical use feature of each application on the apparatus further comprises a quantity of times the respective application has been started or a quantity of application download times of the corresponding application;

wherein the instructions for determining, for each application on the apparatus, the importance level of the respective application according to the historical use feature of the respective application, further comprise instructions for:

sorting the applications on the apparatus according to the respective quantity of times the corresponding application has been started of each application on the apparatus, and dividing the applications on the apparatus into N second type sets in descending order of the respective quantity of times the corresponding application has been started of each application on the apparatus, wherein serial numbers of the N second type sets are 1 to N; and sorting the applications according to the respective quantity of application download times of the corresponding application of each application on the apparatus, and dividing the applications into N third type sets in descending order of the respective quantity of application download times of the corresponding application of each application on the apparatus, wherein serial numbers of the N third type sets are 1 to N;

wherein sequentially shift out identical applications that correspond to each serial number further comprises sequentially sifting out, from the first type set, the second type set, and the third type set, identical applications that correspond to each serial number, and, for each serial number, forming an importance level set corresponding to the respective serial number, wherein a smaller serial number of a corresponding importance level set indicates a higher importance level of any applications in the corresponding importance level set.

11. The apparatus according to claim 10, wherein the instructions for sequentially sifting out the identical applications from the first type set, the second type set, and the third type set that correspond to each serial number, and, for each serial number, forming the respective importance level set corresponding to the respective serial number comprise instructions for:

using, each time an identical application is sifted out from the first type set, the second type set, and the third type set that correspond to one serial number, the identical application in the first type set, the second type set, and the third type set that corresponds to a current serial number as an importance level set corresponding to the current serial number; and respectively adding applications that are not sifted out from the first type set, the second type set, and the third type set that correspond to the current serial number to the first type set, the second type set, and the third type set that correspond to a next serial number.

12. The apparatus according to claim 7, wherein the program further includes instructions for;

receiving a change instruction entered by a user; and changing, based on the change instruction, an importance level of an application that corresponds to the change instruction to a first importance level, wherein the first importance level is specified in the change instruction.

13. A apparatus comprising:

a display;

a processor; and a non-transitory computer-readable storage medium storing a program to be executed by the processor, the program including instructions to:

determine, for each application on the apparatus, an importance level of the respective application on the apparatus according to a historical use feature of the respective application, wherein the historical use feature of the respective application comprises a respective use duration, and the instructions for determining an importance level of the respective application comprises instructions to:

sort applications on the apparatus according to the respective use duration of each application on the apparatus;

divide the applications into N first type sets in descending order of the respective use duration of each application on the apparatus, wherein N is a positive integer greater than 1, and wherein serial numbers of the N first type sets are 1 to N;| sequentially sift out, from the first type set, identical applications that correspond to each serial number, and, for each serial number, forming an importance level set corresponding to the respective serial number, wherein a smaller serial number of a corresponding importance level set indicates a higher importance level of any applications in the corresponding importance level set;

determine, for each application on the apparatus, a notification manner of a notification message of the respective application based on the importance level of the respective application; and control the display, in response to receiving a first notification message, to display the first notification message according to the notification manner corresponding to the application to which the first notification message belongs.

14. The apparatus according to claim 13, wherein the instructions to determine, for each application on the apparatus, the importance level of the respective application include instructions to determine, for each application on the apparatus, a notification time period of the respective application according to an online time or an application type of the respective application.

15. The apparatus according to claim 14, wherein the instructions to control the display, in response to receiving the first notification message, to display the first notification message include instructions to:

determine, in response to receiving the first notification message, whether a current moment is in the notification time period of the application to which the first notification message belongs;

in response to determining that the current moment is in the notification time period of the application to which the first notification message belongs, control the display to display the first notification message according to the notification manner corresponding to the application to which the first notification message belongs; and in response to determining that the current moment is not in the notification time period of the application to which the first notification message belongs, temporarily store the first notification message, and control, when the current moment reaches the notification time period of the application to which the first notification message belongs, the display to display the first notification message according to the notification manner corresponding to the application to which the first notification message belongs.

16. The apparatus according to claim 14, wherein the respective historical use feature of each application on the apparatus further comprises a respective quantity of times the corresponding application has been started or a respective quantity of application download times of the corresponding application; and wherein instructions to determine, for each application on the apparatus, the importance level of the respective application further include instructions to:

sort the applications according to the respective quantity of times the corresponding application has been started of each application on the apparatus, and divide the applications into N second type sets in descending order of the respective quantity of times the corresponding application has been started of each application on the apparatus, wherein serial numbers of the N second type sets are 1 to N; and sort the applications according to the respective quantity of application download times of the corresponding application of each application on the apparatus, and divide the applications into N third type sets in descending order of the respective quantity of application download times of the corresponding application of each application on the apparatus, wherein serial numbers of the N third type sets are 1 to N;

wherein sequentially shift out identical applications that correspond to each serial number further comprises sequentially sift out from the first type set, the second type set, and the third type set, identical applications that correspond to each serial number, and, for each serial number, form an importance level set corresponding to the respective serial number, wherein a smaller serial number of the corresponding importance level set indicates a higher importance level of the application in the corresponding importance level set.

17. The apparatus according to claim 16, wherein the instructions to determine, for each application on the apparatus, the importance level of the respective application include instructions to:

use, each time an identical application is sifted out from the first type set, the second type set, and the third type set that correspond to one serial number, the identical application in the first type set, the second type set, and the third type set that correspond to a current serial number as the importance level set corresponding to the current serial number; and respectively add applications that are not sifted out from the first type set, the second type set, and the third type set that correspond to the current serial number to the first type set, the second type set, and the third type set that correspond to a next serial number.

18. The apparatus according to claim 13, wherein the program further includes instructions for:

receiving a change instruction entered by a user; and changing, according to the change instruction, the importance level of an application that corresponds to the change instruction to a first importance level, wherein the first importance level is specified in the change instruction.

* * * * *